(12) United States Patent
Dalgleish

(10) Patent No.: US 7,270,874 B2
(45) Date of Patent: Sep. 18, 2007

(54) SYNTHETIC PAPER LABEL

(75) Inventor: David Dalgleish, Essex (GB)

(73) Assignee: Arjobex Limited (GB)

( * ) Notice: Subject to any disclaimer, the term of this patent is extended or adjusted under 35 U.S.C. 154(b) by 117 days.

(21) Appl. No.: 10/520,088

(22) PCT Filed: Jul. 4, 2003

(86) PCT No.: PCT/GB03/02890

§ 371 (c)(1),
(2), (4) Date: Jan. 4, 2005

(87) PCT Pub. No.: WO2004/007196

PCT Pub. Date: Jan. 22, 2004

(65) Prior Publication Data

US 2005/0238901 A1    Oct. 27, 2005

(30) Foreign Application Priority Data

Jul. 10, 2002   (GB) ................... 0216052.1

(51) Int. Cl.
*B32B 27/32*   (2006.01)
*G09F 3/02*   (2006.01)

(52) U.S. Cl. ............... 428/317.3; 428/317.7; 428/343; 428/354; 428/915; 428/916

(58) Field of Classification Search ............ 428/317.3, 428/317.7, 343, 354, 916, 915
See application file for complete search history.

(56) References Cited

U.S. PATENT DOCUMENTS

| 4,377,616 A | * | 3/1983 | Ashcraft et al. ............ 428/213 |
| 4,721,638 A | | 1/1988 | Matsuguchi et al. |
| 4,746,556 A | | 5/1988 | Matsuguchi et al. |
| 4,780,364 A | * | 10/1988 | Wade et al. ............. 428/315.5 |
| 5,026,592 A | | 6/1991 | Janocha et al. |
| 5,405,692 A | | 4/1995 | Weng et al. |
| 5,660,925 A | | 8/1997 | Cooley et al. |
| 2005/0238901 A1 | * | 10/2005 | Dalgleish ................... 428/500 |

FOREIGN PATENT DOCUMENTS

| EP | 0 403 161 | 12/1990 |
| EP | 0 470 760 | 2/1992 |
| EP | 0 521 479 | 1/1993 |
| EP | 0 795 399 | 9/1997 |
| EP | 0 862 991 | 9/1998 |
| WO | WO 98/32598 | 7/1998 |
| WO | WO 99/61240 | 12/1999 |
| WO | WO 02/076733 | 10/2002 |
| WO | WO 2004/007196 | 1/2004 |

OTHER PUBLICATIONS

International Search Report completed on Nov. 7, 2003 and issued to a related international application.
Great Britain Search Report under Section 17. Dated Feb. 18, 2003. Issued to a related foreign application.

* cited by examiner

*Primary Examiner*—Daniel Zirker
(74) *Attorney, Agent, or Firm*—Knobbe, Martens, Olson and Bear, LLP

(57) ABSTRACT

A tamper-evident labelling material includes a base layer of synthetic paper that is printable on its upper surface, and an adhesive layer on the lower surface of the base layer. The base layer includes a layer of biaxially-oriented and voided high density polyethylene (HDPE) that has a density of not more than 0.6 $cm^{-3}$.

22 Claims, No Drawings

SYNTHETIC PAPER LABEL

This application is the U.S. National Phase under 35 U.S.C. § 371 of International Application PCT/GB2003/002890, filed Jul. 4, 2003, which claims priority of GB 0216052.1, filed Jul. 10, 2002.

The present invention relates to a synthetic paper label having an external printable surface.

The term "synthetic paper" is used herein and throughout the specification to mean plastics film and sheet products having a feel and printability similar to cellulose paper. It has been recognized that plastics sheet material of this type can provide an improved alternative to paper where durability and toughness are required. Synthetic papers produced from polyolefins have several advantages over other plastics since they offer UV resistance, good tear strength and the ability to be recycled in many post-consumer waste applications. Labels are amongst the established uses of such products.

In certain labelling applications, it is desirable that the label construction should be such as to reveal any attempt at tampering after it has been applied, i.e. it should be "tamper evident". This is particularly important if the label is to be applied to high value products such as cosmetics, perfumes, fine wines and spirits, or medicines, for example to prevent the label being reused on counterfeit goods.

In order to be fully tamper-evident, the label should exhibit internal cohesive failure if an attempt is made to peel the label off the surface to which it has been applied. Preferably, it should shear through its full thickness, because delamination without accompanying shearing through the full thickness of the product could leave the printed surface of the label intact and therefore available for fraudulent purposes. However, a label which delaminates but does not shear as just described would nevertheless represent worthwhile progress in the art.

It is an object of the invention to provide a synthetic paper tamper-evident labelling-material that meets the first, and preferably also the second, of the above-stated requirements.

Accordingly, the present invention provides, in a first aspect, tamper-evident labelling material including a base layer of synthetic paper that is printable on its upper surface, and an adhesive layer on the lower surface of the base layer, characterised in that the base layer includes a layer of biaxially-oriented and voided high density polyethylene (HDPE) that has a density of not more than about 0.6 g cm$^{-3}$. Preferably, the HDPE material has a density of not more than about 0.5 g cm$^{-3}$.

In a second aspect, the invention resides in the use in labelling material, which includes a base layer of synthetic paper that is printable on its upper surface and an adhesive layer on its lower surface, for the purpose of imparting tamper-evident properties, of a layer of biaxially-oriented and voided high density polyethylene (HDPE), characterized in that the layer of biaxially-oriented and voided HDPE has a density not more than about 0.6 g cm$^{-3}$. Preferably, the layer of biaxially-oriented and voided HDPE has a density not more than about 0.5 g cm$^{-3}$.

We have discovered that there is a strong relationship between the density of the voided HDPE material and its cohesive strength. This is believed to be due to the fact that the density of the HDPE material depends on the number of voids created during the stretching process, a less dense material having a larger number of voids and reduced cohesive strength. We have found that if the density is not more than 0.6 g cm$^{-3}$, the labelling material has useful tamper-evident properties, with improved tamper-evident properties being provided if the density is not more than 0.5 g cm$^{-3}$.

The mean cohesive strength of the labelling material, as measured by the tape pull test described below, is preferably not more than about 4N (Newtons) if shearing through the full thickness of the material is to occur when an attempt is made to peel off the label. The mean cohesive strength is more preferably not more than about 3N and even more preferably not more than about 2.5N.

The tape pull test involves measuring the force required to peel off an adhesive tape adhered to the labelling material. The effect of the removal of the tape on the integrity of the labelling material is also observed. The test may conveniently be carried out using 25 mm wide transparent tape of the kind supplied for domestic and office use, for example that sold as "Sellotape* Original" (here and elsewhere in this specification, an asterisk indicates a proprietary trade mark.). The tape is pressed into contact with the surface of the labelling material by hand (normally in the machine direction, if this is known) and the resulting bond is reinforced by running a 1 kg roller over the tape. The tape is then peeled away from the labelling material using a so-called "universal tester" (for example as supplied by Instron Limited, United Kingdom) at a defined speed (typically 250 or 500 mm min$^{-1}$) and defined contained angle (180°). The average force required for this over the duration of the peeling operation is recorded, and provides a measure of the cohesive strength of the material under test. As already mentioned, average values for this peeling force should be less than 4N. There should be clear delamination and breakaway of the label material: in other words the label should break in two through the thickness of the film after an initial delamination step.

Preferably, the labelling material comprises a coextruded core layer of biaxially-oriented and voided HDPE between upper and lower skin layers, wherein the skin layers have a density of more than 0.6 g cm$^{-3}$, preferably more than 0.9 g cm$^{-3}$. The skin layers preferably have a thickness of not more than 2 μm. Preferably, the skin layers consist of biaxially-oriented and substantially unvoided HDPE. The thickness of the core layer is preferably about 100 μm.

Low-density synthetic paper as described above is easily converted into pressure-sensitive adhesive labels, unlike tamper-evident sheet materials produced from PVC or polystyrene, which tend to be brittle and difficult to handle.

The synthetic paper used in the present invention can be produced by generally known techniques, for example simultaneous biaxial orientation techniques as disclosed in British Patents Nos. 1374574 and 1442113 in combination with voiding and/or coextrusion techniques such as disclosed in British Patents Nos. 1470 372, 1490512 or 1492771, European Patent No. 470760B or European Patent Application No. 863177A, all of which are included by reference herein. The proportion of voids must be such as to produce the desired low base layer density and internal cohesive strength. Fillers, rubbers, antioxidants, lubricants, antistatic agents and other additives may be included in the sheet material, as is conventional in the synthetic paper art.

The term "high density polyethylene" as used herein refers to polymers and copolymers of ethylene with minor amounts of other α-olefin monomers as is commonly understood in the industry and as described in the above-mentioned patent publications. The term is also used to refer to mixtures of high density polyethylenes.

Plastics substrates are generally impervious to materials such as printing inks. Thus, they tend to be unsuitable for direct use in ink-based printing processes because the ink has a tendency to remain at the surface of the substrate, without being absorbed. It is well known to modify the surface characteristics of a plastics substrate by applying an absorbent coating composition to the surface of the substrate. Such a coating composition comprises an absorbent filler, which renders the substrate more absorbent to ink, and a polymeric binder, which binds the filler to the surface of the substrate. Prior to application of the coating composition, the surface of the substrate is subjected to flame or corona discharge treatment such that the treated surface has a surface energy of about 47 dynes $cm^{-1}$. Alternatively, if no separate printable coating is to be applied, and the upper skin layer is to provide the printable surface, such a surface treatment can be carried out to provide a more polar surface and the required wettability to more readily accept inks and coatings. The surface may also be suitably textured or modified by the presence of a pigment and/or a filler, and suitably has a printability corresponding to a wettability of at least 40 dynes $cm^{-1}$.

When a printable surface coating is used, it may be formulated in a similar manner to aqueous coatings as commonly used in the paper industry and especially latex-based coatings. Of particular value in the present context, however, are the coatings described in British Patent Application No. 2177413A and European Patent Application No. 1055711A, which are included by reference herein.

Preferably such a printable coating is provided by the application of an aqueous system comprising a polymeric binder, an absorbent pigment and an antistatic agent. Typically the binder:pigment dry weight ratio is in the range 15:100 to 50:100, preferably 22:100 to 35:100, and the antistatic agent:pigment dry weight ratio is from 0.4:100 to 2.5:100. The antistatic agent may be, for example, sodium polyphosphate or another of the agents disclosed in British Patent Application No. 2177413A.

The polymeric binder may be in an aqueous or latex suspension, preferably a latex suspension, and should contain carboxyl groups on the polymer chain of at least one polymeric constituent. The binder may comprise a single polymer or a mixture of polymers. The binder may comprise, for example, starch or protein modified chemically or by physical addition of other polymeric species. Alternatively the binder may comprise a carboxylated styrene-butadiene copolymer, an acrylic polymer or copolymer, or a vinyl acetate polymer or copolymer. Preferably, the binder comprises a carboxylated styrene-butadiene copolymer.

The binder content of the aqueous coating composition may be chosen to suit individual requirements, for example, the stiffness of the coated product. Preferably, the binder content of the composition is in the range 15 to 30% by weight based on the binder plus aqueous phase, and more preferably in the range 20 to 25%.

The absorbent filler may be any dispersible solid but is preferably an inorganic filler or pigment such as calcium carbonate, china clay, or titanium dioxide.

The composition may also contain an insolubilizing agent, preferably a polyanionic zirconium compound, most preferably ammonium zirconium carbonate. If desired, security inclusions such as fluorescent pigments and/or coloured fibres can also be present.

The labelling material is coated with adhesive on its lower surface and is easily converted into labels in conventional manner. Any suitable adhesive may be used, including pressure sensitive adhesives, for example Revecryl* 491, solvent based solutions including rubber based solutions (e.g. DURO-TAK* 6179) or acrylic solutions (e.g. DURO-TAK* 1057) and hot melt adhesives (e.g. DURO-TAK* 4044). Water based emulsions based on acrylic copolymers and/or ethylene vinyl acetate copolymers and terpolymers, or silicone adhesives, can also be used. These are suggestions and are not limiting. Generally, the final-bond to the substrate should be strong and high tack adhesives work well.

The invention will now be illustrated by the following examples, in which all parts and percentages are by weight unless otherwise specified, and all references to melt flow index (MFI) values are as measured by ASTM Method No. 1238.

EXAMPLE 1

A synthetic paper comprising an extruded core layer and two upper and lower coextruded skin layers was first produced.

The core layer was derived from a compound (Mix A) consisting of a mixture of HDPE having an MFI of 0.33; particulate filler ($CaCO_3$, $TiO_2$); voiding agent (a pentaerythritol—maleic anhydride derivative of abietic acid) and processing aids, as follows:

| Mix A | |
|---|---|
| Component | wt % |
| Ampacet* 111096 60% $CaCO_3$ in HDPE | 15.9 |
| ExxonMobil HDPE Paxon* AL55-003 | 55.9 |
| Ampacet* 111096 60% $TiO_2$ in HDPE | 8.00 |
| Nova Chemicals Polystyrene High Heat 1300 | 3.95 |
| Omya Omyalene* G.200 88% $CaCO_3$ in LDPE | 8.00 |
| DRT Dertoline* DP 001 voiding agent | 8.00 |
| Ciba Geigy Irganox* B215 anti-oxidant | 0.22 |

The two coextruded outer layers were each derived from a dry blend mixture of HDPE having an MFI of 0.33 and linear low density polyethylene (LLDPE) having an MFI of 2.0, as follows:

| Mix B | |
|---|---|
| Component | wt % |
| ExxonMobil HDPE Paxon* AL55-003 | 75 |
| ExxonMobil LLDPE LL-1002 | 25 |

Mix A was compounded at 210° C. by a conventional extrusion, dicing and cooling process. This compound was introduced into the primary extruder of an in-line twin extruder—distributor—sheeting die coextrusion arrangement. Mix B was introduced into a coextruder feeding the distributor. The sheeting die and distributor were of a conventional type enabling a three layer coextrudate to be produced continually, comprising a homogeneous layer of Mix B on each side of a layer of Mix A. The throughput of the in line primary/secondary extruders was arranged to be 650 kg per hour from screw speeds of 22 and 33 rpm respectively, with an exit temperature of 191° C. The throughput of the coextruder was 28 kg per hour from a screw speed of 12 rpm with an exit temperature of 185° C. The output of the extruders was fed to the distribution block held at 210° C. The die lips were adjusted to 5 mm and the sheeting die gave an extrudate of about 420 mm wide. This composite sheet was then fed directly onto and around a set of cooling and conditioning rollers having the following temperatures:

| | | |
|---|---|---|
| ROLL 1 | ° C. | 54.0 |
| ROLL 2 | ° C. | 76.0 |
| ROLL 3 | ° C. | 77.0 |
| ROLL 4 | ° C. | 90.0 |
| COND ROLL 5 | ° C. | 118.0 |
| COND. ROLL 6 | ° C. | 116.0 |
| COND ROLL 7 | ° C. | 118.0 |
| COND. ROLL 8 | ° C. | 121.0 |
| COND. ROLL 9 | ° C. | 121.0 |
| COND. ROLL 10 | ° C. | 121.0 |

The final conditioned composite sheet, which had an overall thickness of about 1000 µm with a core thickness of 960 µm and outer skin thicknesses of 20 µm, was then fed into a simultaneous biaxial stretching apparatus of the type described and illustrated in British Patent No.1442113. The apparatus was arranged to produce a 4:1 stretch in each of the longitudinal or machine direction (MD) and transverse direction (TD). The stretching apparatus was provided with a 6-zoned oven: zones 1 and 2 provided preheat, zones 3 and 4 the stretching section and zones 5 and 6 the annealing section. The temperatures are given in the following table:

| | | |
|---|---|---|
| ZONE 1 | ° C. | 135.0 ± 2 |
| ZONE 2 | ° C. | 125.0 ± 2 |
| ZONE 3 | ° C. | 117.0 ± 2 |
| ZONE 4 | ° C. | 117.0 ± 2 |
| ZONE 5 | ° C. | 130.0 |
| ZONE 6 | ° C. | 130.0 |

The composite plastics film thus produced was cooled, edge trimmed and passed through a corona discharge treatment unit such that the product had a surface energy of about 47 dynes cm$^{-1}$. Finally it was wound into reels approximately 1500 mm wide.

Typical properties measured for samples of synthetic paper film produced as described above are given in the following table:

| Property | MD | TD |
|---|---|---|
| Tensile (N/mm$^2$) | 39 | 30 |
| Elongation (%) | 100 | 79 |
| Tear (N/mm) | 50 | 76 |
| Stiffness(Gurley) | 64 | 60 |
| Opacity | 96 | |
| Core Thickness (µm) | 100 | |
| Core density (g cm$^{-3}$) | 0.50 | |

A printability coating was later applied to both surfaces of the film using an air-knife coater, and then dried. The approximate formulation of the coating was as follows:

| | Parts by weight |
|---|---|
| Water | 100 |
| Acrylate dispersant | 5 |
| Ground calcium carbonate of which 90% of the particles are below 2 µm particle size | 100 |
| Anionic wetting agent | 2 |
| Mixture of acrylonitrile acrylate styrene copolymer (50% solids content) and styrene/n-butanol copolymer (50% solids content) in the ratio 1:4 | 63 |
| Ammonium zirconium carbonate | 4 |

As already mentioned, the cohesive strength of the synthetic paper film (which provides a valuable predictor of tamper-evident character) is particularly important in this application.

Typical measured peeling force (cohesive strength) values for samples of 50 g m$^{-2}$ synthetic paper film produced as described above and having 4 g m$^{-2}$ printability coatings on each surface (i.e. total 58 g m$^{-2}$) are given in the following table. The measurement method was as described earlier in this specification, with peel speeds of 250 and 500 mm min$^{-1}$. The maximum measured peeling force (cohesive strength) during the peeling operation was also noted.

| Peel Speed mm/min | Maximum Cohesive Strength (N) | Average Cohesive Strength (N) |
|---|---|---|
| 250 | 3.15 ± 0.15 | 2.2 ± 0.15 |
| 500 | 3.5 ± 0.2 | 2.05 ± 0.1 |

It was observed that each sample broke away through the thickness of the substrate during the peeling operation. As explained earlier in this specification, achievement of this property is very significant in terms of a fully satisfactory tamper-evident effect.

When samples of synthetic paper film produced as described above were coated with a pressure sensitive adhesive laminated with release paper and die cut, the resulting labels could be easily adhered to glass containers but attempts at removal always left part of the label on the bottle, making fraudulent label transfer impossible.

EXAMPLE 2

The following mixture was compounded as in Mix A, Example 1.

| Component | wt % |
|---|---|
| Ampacet 111096 60% CaCO$_3$ + TiO$_2$ in HDPE | 19.06 |
| ExxonMobil HDPE Paxon AL55-003 | 64.9 |
| Nova Chemicals Polystyrene High Heat 1300 | 3.17 |
| Omya Omyalene G.200 88% CaCO$_3$ in LDPE | 6.34 |
| DRT Dertoline DP 001(a pentaerythritol - maleic anhydride derivative of abietic acid) | 6.34 |
| Ciba Geigy Irganox B215 (anti oxidant) | 0.19 |

As in Example 1, this compound was introduced into the primary extruder of a twin extruder—distributor—sheeting die coextrusion arrangement and a dry blend mixture of Exxon Mobil HDPE Paxon AL55-003 (MFI (ASTM 1238) =0.33)(75%) and Exxon Mobil LLDPE LL-1002 (MFI (ASTM 1238)=2.0) (25%) (mix B) was introduced into a coextruder feeding the distributor. The throughput of the in line primary/secondary extruders was arranged to be 650 kg per hour and the throughput of the coextruder was 28 kg per hour. The output of the extruders was fed to the distribution block held at 210° C. The die lips were adjusted to 5 mm and the sheeting die gave an extrudate of about 420 mm wide. This composite sheet was formed into a biaxially-oriented sheet using the roller arrangement and stretcher conditions of Example 1.

The composite plastics film thus produced was cooled, edge trimmed and passed through a corona discharge treatment unit to give a treatment level of about 47 dynes/cm. Finally it was wound into reels approximately 1500 mm wide.

The properties of the film are given in the following table:

| Property | MD | TD |
| --- | --- | --- |
| Tensile (N/mm$^2$) | 35 | 32 |
| Elongation (%) | 130 | 100 |
| Tear (N/mm) | 62 | 69 |
| Opacity | | 92 |
| Thickness (μm) | | 90 |
| Density (g cm$^{-3}$) | | 0.57 |

The substrate was coated to provide a printable surface, according to GB-A-2177413 and the European patent application EP-1055711 -A2.

The surface cohesive strength for a product coated to give 4 gsm per side and using the tape peel test described before is given in the table below:

| Peel Speed mm/min | Maximum Surface Cohesive Strength (N) | Average Surface Cohesive Strength (N) |
| --- | --- | --- |
| 250 | 5.8 ± 0.3 | 3.8 ± 0.3 |

The peel action of the tape did not always rupture the product and as such this substrate was not as good as the material from Example 1 and it would therefore be more exacting in matching the adhesive of the final label to the substrate to be labeled, to provide good tamper-evident properties. Nevertheless, when this substrate was coated with a pressure sensitive adhesive laminated with release paper and die cut, the resulting labels could be easily adhered to glass containers but attempts at removal would always leave part of the label on the bottle, making complete label transfer impossible.

COMPARATIVE EXAMPLE 3

The following mixture was compounded as in Mix A, Example 1.

| Component | wt % |
| --- | --- |
| Ampacet 111096 60% CaCO$_3$ + TiO$_2$ in HDPE | 15.88 |
| ExxonMobil HDPE Paxon AL55-003 | 70.76 |
| Nova Chemicals Polystyrene High Heat 1300 | 2.64 |
| Omya Omyalene G.200 88% CaCO$_3$ in LDPE | 5.28 |
| DRT Dertoline DP 001(a pentaerythritol - maleic anhydride derivative of abietic acid) | 5.28 |
| Ciba Geigy Irganox B215 (anti oxidant) | 0.16 |

A biaxially-oriented sheet was formed as described in Examples 1 and 2 using the above mixture in place of Mix A and the same coextruding procedure with Mix B. After corona treatment the film had the following properties.

| Property | MD | TD |
| --- | --- | --- |
| Tensile (N/mm$^2$) | 45 | 35 |
| Elongation (%) | 120 | 130 |
| Tear (N/mm) | 82 | 106 |
| Opacity | | 94 |
| Thickness (μm) | | 100 |
| Density (g cm$^{-3}$) | | 0.7 |

The surface cohesive strength for a product coated to give 4 gsm per side and using the tape peel test described before is given in the table below:

| Peel Speed mm/min | Maximum Surface Cohesive Strength (N) | Average Surface Cohesive Strength (N) |
| --- | --- | --- |
| 250 | 7.4 ± 0.3 | 7.0 ± 0.3 |

The peel action of the tape did not rupture the product and as such this substrate was not suitable for the intended purpose.

The relationships between density, cohesive strength and tamper evident performance at a peel speed of 250 mm/min for each of Examples 1, 2 and 3 are summarised in the following table:

| Example | Density (g cm$^{-3}$) | Maximum Cohesive Strength (N) | Average Cohesive Strength (N) | Performance Rating |
| --- | --- | --- | --- | --- |
| 1 | 0.50 | 3.15 | 2.2 | Very good |
| 2 | 0.57 | 5.8 | 3.8 | Good |
| 3 | 0.70 | 7.4 | 7.0 | Poor |

This demonstrates that there is a strong relationship between the density of the voided HDPE material and its cohesive strength. This is believed to be due to the fact that the density of the HDPE material depends on the number of voids created during the stretching and orientation process, a less dense material having a larger number of voids and therefore less cohesive strength. We have found that if the density is about 0.6 g cm$^{-3}$ or less the labelling material has an average cohesive strength of about 4N or less, which provides good tamper-evident properties, whereas if the density is about 0.5 g cm$^{-3}$ or less the cohesive strength is about 2.5N or less, which provides very good tamper-evident properties. On the other hand, if the density is 0.7 g cm$^{-3}$ or more, as illustrated by comparative example 3, the material has a cohesive strength of about 7N or more, which provides poor (i.e. unsatisfactory) tamper-evident properties.

What is claimed is:

1. A tamper-evident labeling material comprising a base layer of synthetic paper that comprises a coextruded core layer between upper and lower skin layers, wherein the base layer is printable on its upper surface and has an adhesive layer on the lower surface of the base layer, wherein the core layer comprises a layer of biaxially-oriented and voided high density polyethylene (HDPE) that has a density of not more than 0.6 g cm$^{-3}$.

2. The tamper-evident labelling material as claimed in claim 1, wherein the layer of biaxially-oriented and voided HDPE has a density of not more than 0.5 g cm$^{-3}$.

3. The tamper-evident labelling material as claimed in claim 1, wherein the mean cohesive strength of the labelling material is not more than about 4N.

4. The tamper-evident labelling material as claimed in claim 1, wherein the mean cohesive strength of the labelling material is not more than about 3N.

5. The tamper-evident labelling material as claimed in claim 1, wherein the skin layers have a density of more than 0.6 g cm$^{-3}$.

6. The tamper-evident labelling material as claimed in claim 1, wherein the skin layers have a density of more than 0.9 g cm$^{-3}$.

7. The tamper-evident labelling material as claimed in claim 1 wherein the skin layers have a thickness of not more than 2 μm.

8. The tamper-evident labelling material as claimed in claim 1, wherein the skin layers consist of biaxially-oriented and substantially unvoided HDPE.

9. The tamper-evident labelling material as claimed in claim 1, wherein the thickness of the core layer is about 100 μm.

10. The tamper-evident labelling material as claimed in claim 1, wherein the base layer comprises a printable layer comprising a polymeric binder, an absorbent pigment and an antistatic agent.

11. The tamper-evident labelling material as claimed in claim 10, wherein the binder: pigment dry weight ratio is in the range 15:100 to 50:100, and the antistatic agent: pigment dry weight ratio is from 0.4:100 to 2.5:100.

12. The tamper-evident labelling material as claimed in claim 11, wherein the binder comprises a carboxylated styrene-butadiene copolymer.

13. A method of imparting tamper-evident properties to a labeled product, comprising incorporating a labelling material onto said product by an adhesive bond, wherein the labelling material comprises a base layer of synthetic paper that comprises a coextruded core layer between upper and lower skin layers, wherein the base layer is printable on its upper surface and has an adhesive layer on its lower surface, the core layer comprising a layer of biaxially-oriented and voided high density polyethylene (HDPE), wherein the core layer of biaxially-oriented and voided HDPE has a density of not more than 0.6 g cm$^{-3}$.

14. The method as claimed in claim 13, wherein the layer of biaxially-oriented and voided HDPE has a density of not more than 0.5 g cm$^{-3}$.

15. The method as claimed in claim 13, wherein the mean cohesive strength of the labelling material is not more than about 4N.

16. The method as claimed in claim 13, wherein the mean cohesive strength of the labelling material is not more than about 3N.

17. The method as claimed in claim 13, wherein the skin layers have a density of more than 0.6 g cm$^{-3}$.

18. The method as claimed in claim 13, wherein the skin layers have a density of more than 0.9 g cm$^{-3}$.

19. The method as claimed in claim 13, wherein the skin layers have a thickness of not more than 2 μm.

20. The method as claimed in claim 13, wherein the skin layers consist of biaxially-oriented and substantially unvoided HDPE.

21. The method as claimed in claim 13, wherein the thickness of the core layer is about 100 μm.

22. The tamper-evident labelling material as claimed in claim 10, wherein the binder: pigment dry weight ratio is in the range 22:100 to 35:100, and the antistatic agent: pigment dry weight ratio is from 0.4:100 to 2.5:100.

* * * * *